(12) United States Patent
Otsuka et al.

(10) Patent No.: US 8,143,818 B2
(45) Date of Patent: Mar. 27, 2012

(54) ULTRASONIC MOTORIZED STAGE

(75) Inventors: Shin Otsuka, Tokyo (JP); Yoshihiro Ue, Hidaka (JP)

(73) Assignee: Olympus Corporation, Tokyo (JP)

( * ) Notice: Subject to any disclaimer, the term of this patent is extended or adjusted under 35 U.S.C. 154(b) by 280 days.

(21) Appl. No.: 12/540,547

(22) Filed: Aug. 13, 2009

(65) Prior Publication Data

US 2010/0052596 A1  Mar. 4, 2010

(30) Foreign Application Priority Data

Sep. 3, 2008  (JP) ................................ 2008 225726

(51) Int. Cl.
*H02N 2/00* (2006.01)
*G12B 5/00* (2006.01)
*H01L 41/09* (2006.01)

(52) U.S. Cl. .................. 318/114; 318/592; 310/316.02; 310/323.17

(58) Field of Classification Search .................. 318/592, 318/34, 38, 114; 310/316.02, 323.17; 359/391
See application file for complete search history.

(56) References Cited

U.S. PATENT DOCUMENTS

| 7,317,291 B2* | 1/2008 | Atsuta et al. | 318/119 |
| 7,635,940 B2* | 12/2009 | Ue et al. | 310/317 |
| 7,900,896 B2* | 3/2011 | Fujita | 269/58 |
| 2006/0238072 A1* | 10/2006 | Funakubo | 310/323.16 |
| 2009/0218510 A1* | 9/2009 | Fujita | 250/443.1 |
| 2011/0089771 A1* | 4/2011 | Brooker et al. | 310/12.05 |

FOREIGN PATENT DOCUMENTS

| JP | 11-352265 A | 12/1999 |
| JP | 2003-114291 A | 4/2003 |

* cited by examiner

*Primary Examiner* — Eduardo Colon Santana
(74) *Attorney, Agent, or Firm* — Holtz, Holtz, Goodman & Chick, PC

(57) ABSTRACT

An ultrasonic motorized stage includes a base part, first and second tables, first and second linear ultrasonic motors which respectively drive the first and the second tables, and first and second optical linear sensors which respectively detect the amount of move of the first and the second tables. The first and the second linear ultrasonic motors and the first and the second optical linear sensors are arranged in positions, which are at sides other than the front side of the ultrasonic motorized stage and prevent wear debris generated when the first and/or the second linear ultrasonic motor is driven from affecting the first and the second optical linear sensors, so that the first and the second linear ultrasonic motors and the first and the second optical linear sensors do not protrude upward from the upper surface of the second table.

8 Claims, 5 Drawing Sheets

ULTRASONIC MOTORIZED STAGE

CROSS-REFERENCE TO RELATED APPLICATIONS

This application is based upon and claims the benefit of priority from the prior Japanese Patent Application No. 2008-225726, filed Sep. 3, 2008, the entire contents of which are incorporated herein by reference.

BACKGROUND OF THE INVENTION

1. Field of the Invention

The present invention relates to an ultrasonic motorized stage using a linear ultrasonic motor.

2. Description of the Related Art

As microscope stages, motorized stages have been popularized as a replacement for manual stages. Their stage driving units are motorized by using a stepping motor in many cases. For example, for the motorized stage moving mechanism recited in Patent Document 1 (Japanese Laid-open Patent Publication No. 2003-114291), stage driving units, which are respectively mounted on the front surface and a side surface of a stage, enable the stage to move in the planar direction. In the microscope field, stages are required to be slightly driven in many cases. Therefore, a lot of motorized stages are also equipped with a displacement sensor to use feedback control.

In the meantime, since ultrasonic motors are small in size, have high responsiveness and can slightly drive a stage, they are used as an actuator for a stage driving unit. Ultrasonic motors operate by bouncing a sliding plate mounted on a side to be moved. Because the amount of move cannot be currently controlled without a displacement sensor, most ultrasonic motors are used along with a displacement sensor. As the displacement sensor, a sensor for optically reading a scale mounted on a side to be measured is used. The ultrasonic motor, the sliding plate, the displacement sensor and the scale are used as a stage driving unit. Development is in progress, such as improving the detection accuracy of displacement by integrating the sliding plate and the scale into one body, for example, like the stage recited in Patent Document 2 (Japanese Laid-open Patent Publication No. H11-352265).

SUMMARY OF THE INVENTION

An ultrasonic motorized stage according an embodiment of the present invention includes a base part, a first table, a first linear ultrasonic motor, a first optical linear sensor, a second table, a second linear ultrasonic motor, and a second optical linear sensor. The first table is supported to be movable in parallel with respect to the base part. The first linear ultrasonic motor drives the first table. The first optical linear sensor detects the amount of move of the first table. The second table is supported to be movable in parallel with respect to the first table in a direction perpendicular to the moving direction of the first table. The second linear ultrasonic motor drives the second table. The second optical linear sensor detects the amount of move of the second table. The first linear ultrasonic motor, the first optical linear sensor, the second linear ultrasonic motor, and the second optical linear sensor are arranged in positions, which are at sides other than the front side of the ultrasonic motorized stage and prevent wear debris generated when the first linear ultrasonic motor and/or the second linear ultrasonic motor is driven from affecting the first optical linear sensor and the second optical linear sensor, so that the first linear ultrasonic motor, the first optical linear sensor, the second linear ultrasonic motor, and the second optical linear sensor do not protrude upward from the upper surface of the second table.

DESCRIPTION OF THE PREFERRED EMBODIMENT

An embodiment according to the present invention is described below with reference to the drawings.

Figure 1:
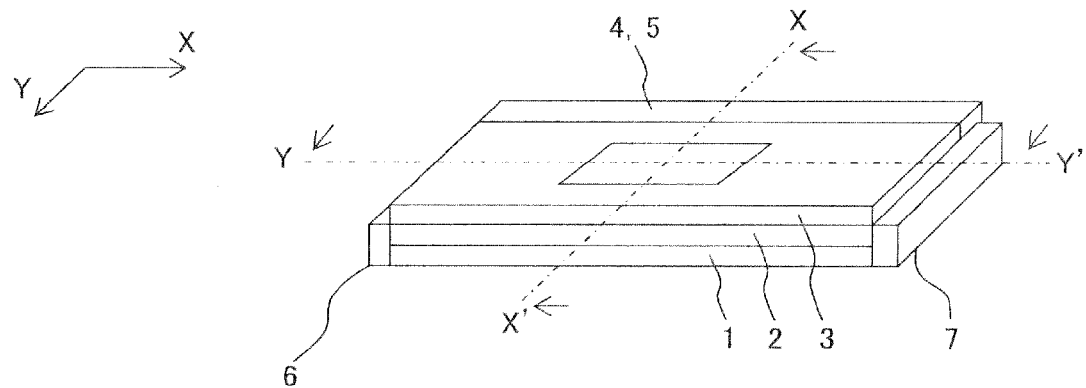
FIG. 1 is a schematic diagram illustrating a configuration example of an ultrasonic motorized stage according to an embodiment.
Figure 2:
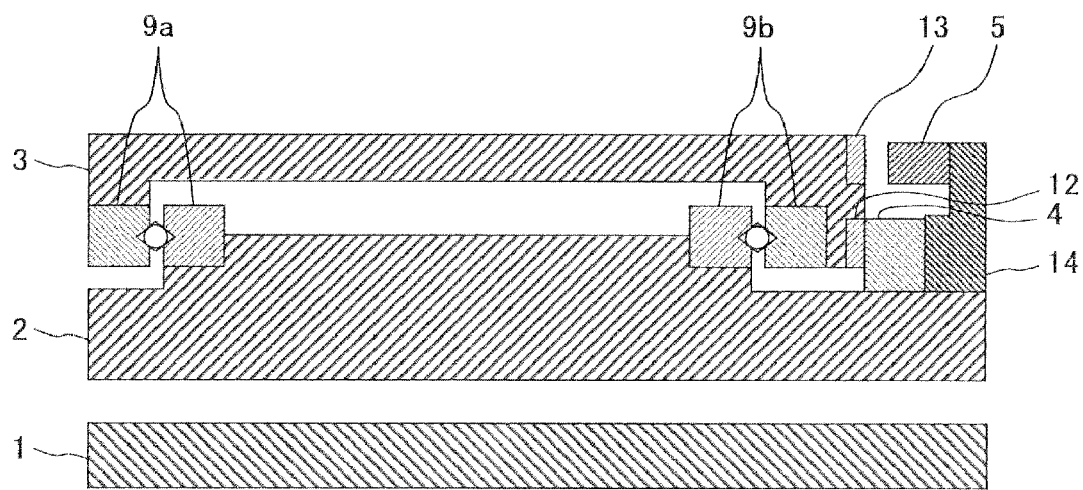
FIG. 2 is a schematic diagram illustrating the details of an X-X' cross-section of the ultrasonic motorized stage illustrated in FIG. 1.
Figure 3:
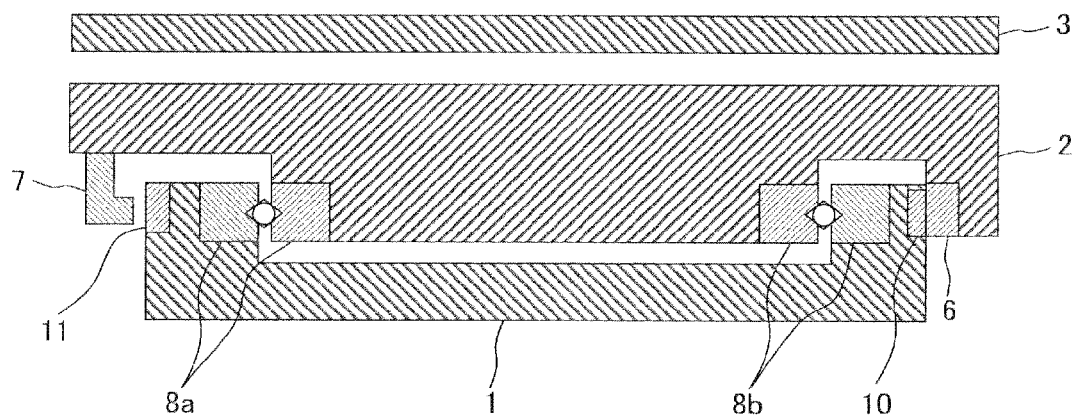
FIG. 3 is a schematic diagram illustrating the details of a Y-Y' cross-section of the ultrasonic motorized stage illustrated in FIG. 1.

FIG. 1 is a schematic diagram illustrating a configuration example of an ultrasonic motorized stage according to the embodiment of the present invention. FIG. 2 is a schematic diagram illustrating the details of an X-X' cross-section of the ultrasonic motorized stage illustrated in FIG. 1. FIG. 3 is a schematic diagram illustrating the details of a Y-Y' cross-section of the ultrasonic motorized stage illustrated in FIG. 1.

The ultrasonic motorized stage according to this embodiment is used as a microscope stage. The outline of the configuration of the ultrasonic motorized stage is initially described with reference to FIG. 1.

As illustrated in this FIG. 1, the ultrasonic motorized stage according to this embodiment includes a base part 1, a Y table 2, and an X table 3. The base part 1 is also a microscope mounting part. The Y table 2 is provided on the base part 1, and supported to be movable in parallel to the Y direction with respect to the base part 1. The X table 3 is provided on the Y table 2, and supported to be movable in parallel to the X direction with respect to the Y table 2.

At the rear side of the ultrasonic motorized stage, a linear ultrasonic motor 4 for driving the X table 3 in the X direction with respect to the Y table 2, and an optical linear sensor 5, which is a displacement sensor, for detecting the amount of move of the X table 3 are provided. Additionally, a linear ultrasonic motor 6 for driving the Y table 2 in the Y direction with respect to the base part 1 is provided at one side of the ultrasonic motorized stage. At the other side of the ultrasonic motorized stage, an optical linear sensor 7, which is a displacement sensor, for detecting the amount of move of the Y table 2 is provided.

This FIG. 1 schematically illustrates the linear ultrasonic motor 4, the optical linear sensor 5, the linear ultrasonic motor 6 and the optical linear sensor 7 for convenience of explanation.

Additionally, as illustrated in this FIG. 1, in the ultrasonic motorized stage according to this embodiment, the linear ultrasonic motor 4, the optical linear sensor 5, the linear ultrasonic motor 6 and the optical linear sensor 7 are arranged in positions, which are at sides other than the front side of the ultrasonic motorized stage and prevent wear debris generated when the linear ultrasonic motor 4 and/or 6 is driven from affecting the optical linear sensors 5 and 7 as will be described later, so that the linear ultrasonic motor 4, the optical linear sensor 5, the linear ultrasonic motor 6 and the optical linear sensor 7 do not protrude from the upper surface of the X table.

Details of the configuration of the ultrasonic motorized stage according to this embodiment are described next with reference to FIGS. 2 and 3.

In the ultrasonic motorized stage according to this embodiment, Y linear guides 8a and 8b are arranged between the base part 1 and the Y table 2. One portion of the Y linear guides 8a and 8b is fixed to the base part 1, whereas the other portion is fixed to the Y table 2 as illustrated in FIG. 3. As a result, the Y table 2 can be moved in parallel to the Y direction with respect to the base part 1. Moreover, X linear guides 9a and 9b are arranged between the Y table 2 and the X table 3 as illustrated in FIG. 2. One portion of the X linear guides 9a and 9b is fixed to the Y table 2, whereas the other portion is fixed to the X table 3. As a result, the X table 3 can be moved in parallel to the X direction with respect to the Y table 2.

As illustrated in FIG. 3, a Y sliding plate 10 is provided at one side of the base part 1, and the linear ultrasonic motor 6 fixed to the Y table 2 is provided to contact the Y sliding plate 10 in a position facing the Y sliding plate 10. The linear ultrasonic motor 6 is driven (the linear ultrasonic motor 6 bounces the Y sliding plate 10), whereby the Y table 2 can be moved in parallel to the Y direction with respect to the base part 1. Moreover, a Y linear scale 11 is provided at the other side of the base part 1, and the optical linear sensor 7 fixed to the Y table 2 is provided in a position facing the Y linear scale 11 at a predetermined spacing. As a result, the amount of move of the Y table 2 can be detected.

As illustrated in FIG. 2, an X sliding plate 12 is provided at the bottom of the side of the X table 3, which is the rear side of the ultrasonic motorized stage, and the linear ultrasonic motor 4 fixed to the Y table 2 is provided to contact the X sliding plate 12 in a position facing the X sliding plate 12. The Linear ultrasonic motor 4 is driven (the linear ultrasonic motor 4 bounces the X sliding plate 12), whereby the X table 3 can be moved in parallel to the X direction with respect to the Y table 2. Moreover, an X linear scale 13 is provided at the top of the same side of the X table 3, and the optical linear sensor 5 fixed to the Y table 2 via a sensor fixing member 14 is provided in a position facing the X linear scale 13 at a predetermined spacing. As a result, the amount of move of the X table 3 can be detected.

As described above, in the ultrasonic motorized stage according to this embodiment, the linear ultrasonic motor 6 and the optical linear sensor 7 are arranged at both sides of the ultrasonic motorized stage, which sandwich the driving axis of the Y table 2, and the linear ultrasonic motor 4 and the optical linear sensor 5 are arranged to be vertically stacked at the rear side of the ultrasonic motorized stage.

With the above described configuration, the linear ultrasonic motor 4 and the optical linear sensor 5 are collectively arranged to be vertically stacked at the rear side of the ultrasonic motorized stage, and the X sliding plate 12 and the X linear scale 13 are arranged to be efficient for the vertically stacked motor and sensor. Accordingly, a movable range in the X direction can be widely secured without changing the length of the table in the X direction.

Additionally, the linear ultrasonic motor 4 is arranged above the optical linear sensor 5, whereby wear debris generated between the linear ultrasonic motor 4 and the X sliding plate 12 can be prevented from affecting the optical linear sensor 5 when the linear ultrasonic motor 4 is driven. Accordingly, a malfunction in the optical linear sensor 5, which is caused by the wear debris, can be prevented. Note that the linear ultrasonic motor 4 and the optical linear sensor 7 are positioned apart, and also the linear ultrasonic motor 6 and the optical linear sensors 5 and 7 are positioned apart. Therefore, wear debris generated when the linear ultrasonic motor 4 is driven is prevented from affecting the optical linear sensor 7, and also wear debris generated when the linear ultrasonic motor 6 is driven does not affect the optical linear sensors 5 and 7.

Additionally, the linear ultrasonic motor 6 and the optical linear sensor 7 are arranged separately at the sides of the ultrasonic motorized stage, whereby the height of the ultrasonic motorized stage can be reduced while widely securing the movable range in the Y direction.

Furthermore, the linear ultrasonic motor 4, the optical linear sensor 5, the X sliding plate 12, the X linear scale 13, the linear ultrasonic motor 6, the optical linear sensor 7, the Y sliding plate 10, and the Y linear scale 11 do not protrude from the front and the top sides of the ultrasonic motorized stage. Accordingly, the design concept and the operability of a microscope, and its workability on the stage can be maintained. As a result, a design concept and functionality more than a manual stage can be realized.

The ultrasonic motorized stage according to this embodiment can be diversely modified.

For example, the arrangement positions of the linear ultrasonic motor 6 and the Y sliding plate 10, and those of the optical linear sensor 7 and the Y linear scale 11 are replaceable. Namely, the optical linear sensor 7 and the Y linear scale 11 can be arranged at the side where the linear ultrasonic motor 6 and the Y sliding plate 10 are arranged, and the linear ultrasonic motor 6 and the Y sliding plate 10 can be arranged at the side where the optical linear sensor 7 and the Y linear scale 11 are arranged.

Additionally, for example, the destinations to which the linear ultrasonic motor 4 and the X sliding plate 12 are respectively fixed are replaceable. Namely, the linear ultrasonic motor 4 and the X sliding plate 12 can be fixed to the X table 3 and the Y table 2, respectively. Similarly, the destinations to which the optical linear sensor 5 and the X linear scale 13 are fixed, and the destinations to which the linear ultrasonic motor 6 and the Y sliding plate 10 are fixed, and the destinations to which the optical linear sensor 7 and the Y linear scale 11 are fixed are replaceable, respectively.

Figure 4:
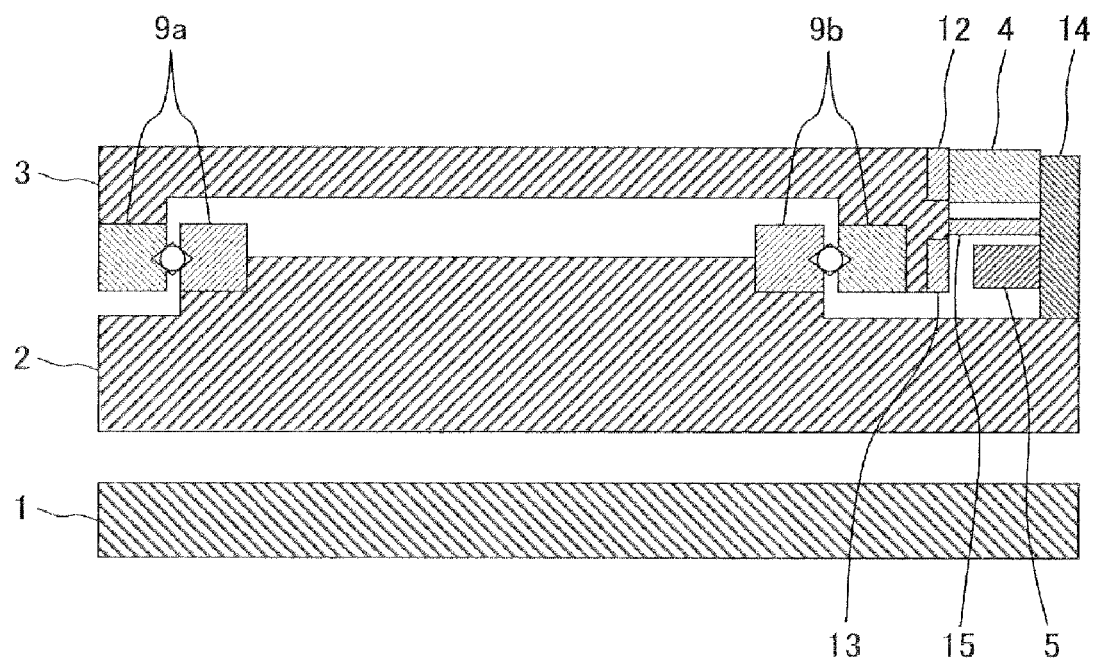
FIG. 4 is a schematic diagram illustrating the details of an X-X' cross-section of an ultrasonic motorized stage according to a modification example of the embodiment.

Furthermore, for example, the arrangement positions of the linear ultrasonic motor 4 and the X sliding plate 12, and those of the optical linear sensor 5 and the X linear scale 13 can be turned upside down at the rear side of the ultrasonic motorized stage as illustrated in FIG. 4. In this case, however, a wear debris receiving unit 15 that is fixed to the Y table 2 via the sensor fixing member 14 is arranged between the linear ultrasonic motor 4 and the optical linear sensor 5 as illustrated in FIG. 4 so that wear debris generated between the linear ultrasonic motor 4 and the X sliding plate 12 does not affect the optical linear sensor 5 when the linear ultrasonic motor 4 is driven. In this case, also the linear ultrasonic motor 4 is fixed to the Y table 2 via the sensor fixing member 14.

With this configuration, the optical linear sensor 5 becomes stable by being arranged in the vicinity of the Y table 2 to which the optical linear sensor 5 is fixed, whereby the accuracy of the sensor can be improved. Moreover, the wear debris receiving unit 15 is arranged to be able to receive the wear debris generated between the linear ultrasonic motor 4 and the X sliding plate 12. As a result, measures against the wear debris can be taken.

Figure 5:
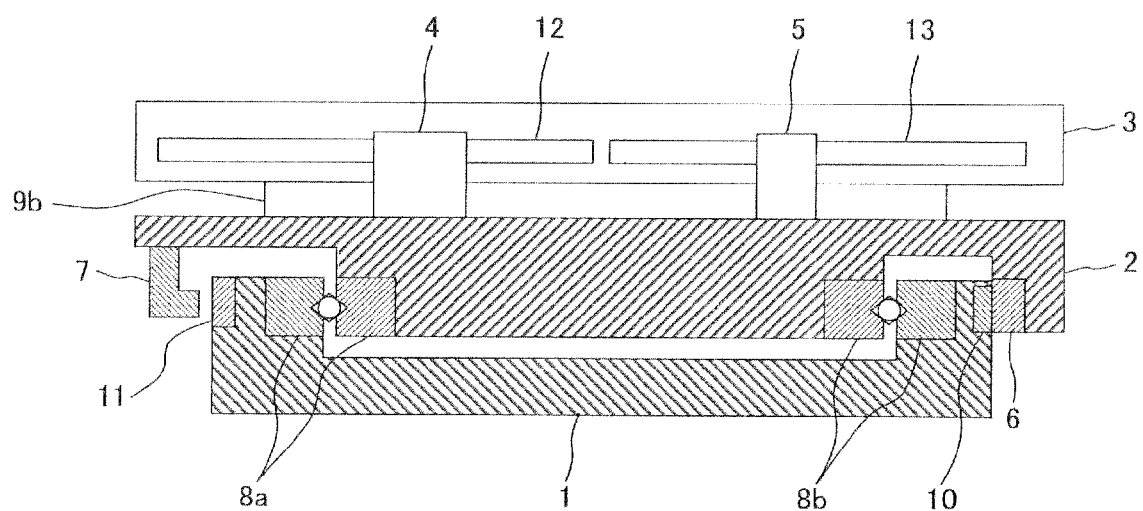
FIG. 5 is a schematic diagram partially including a rear view and illustrating the details of a Y-Y' cross-section of the ultrasonic motorized stage according to a modification example of the embodiment.

Additionally, for example, the arrangement positions of the linear ultrasonic motor 4 and the X sliding plate 12, and those of the optical linear sensor 5 and the X linear scale 13 can also be a side-by-side arrangement at the rear side of the ultrasonic motorized stage as illustrated in FIG. 5. FIG. 5 corresponds to FIG. 3. However, this figure illustrates the portion below the Y table 2 as a cross-sectional view, and the portion above the Y table 2 as a rear view. With such a configuration, the height of the ultrasonic motorized stage can be reduced. Additionally, to more widely secure the movable range of the X table 3 with respect to the Y table in the configuration illustrated in FIG. 5, the X sliding plate 12 or the X linear scale 13 can be arranged by being shifted in the height direction so that the X sliding plate 12 and the X linear scale 13 do not overlap. In this case, the linear ultrasonic motor 4 and the optical linear sensor 5 are naturally arranged in positions corresponding to the X sliding plate 12 and the X linear scale 13.

Furthermore, for example, the arrangement configuration for the linear ultrasonic motor 4, the X sliding plate 12, the optical linear sensor 5 and the X linear scale 13 at the rear side of the above described ultrasonic motorized stage is also applicable to the arrangement configuration for the linear ultrasonic motor 6, the Y sliding plate 10, the optical linear sensor 7 and the Y linear scale 11. If the linear ultrasonic motor 6, the Y sliding plate 10, the optical linear sensor 7 and the Y linear scale 11 are collectively arranged at one side, they may be arranged at whichever of the left and the right sides of the ultrasonic motorized stage as a matter of course. In this case, the horizontal direction of the ultrasonic motorized stage can be further downsized. Moreover, in this case, the linear ultrasonic motor 6 and the optical linear sensor 7 can be arranged to be vertically stacked in a similar manner as in FIGS. 2 and 4. Furthermore, the linear ultrasonic motor 6 and the optical linear sensor 7 can be arranged side by side in a similar manner as in FIG. 5. If the linear ultrasonic motor 6 is arranged above the optical linear sensor 7, the wear debris receiving unit is naturally arranged between the linear ultrasonic motor 6 and the optical linear sensor 7 in a similar manner as in FIG. 4.

Furthermore, for example, the above described destinations to which the linear ultrasonic motor 4 and the X sliding plate 12 are fixed, destinations to which the optical linear sensor 5 and the X linear scale 13 are fixed, destinations to which the linear ultrasonic motor 6 and the Y sliding plate 10 are fixed, and destinations to which the optical linear sensor 7 and the Y linear scale 11 are fixed are replaceable, respectively.

Up to this point, the present invention has been described in detail. The present invention is not limited to the above described embodiment, and can be diversely modified and changed in a scope that does not depart from the gist of the present invention as a matter of course.

As described above, according to the embodiments of the present invention, operability and design concept can be improved by preventing the stage driving units from protruding from the front and the top sides of the stage, and at the same time, a malfunction in a displacement sensor, which is caused by wear debris generated when an ultrasonic motor is driven, can be prevented.

What is claimed is:

1. An ultrasonic motorized stage, comprising:
   a base part;
   a first table supported to be movable in parallel with respect to the base part;
   a first linear ultrasonic motor for driving the first table;
   a first optical linear sensor for detecting an amount of movement of the first table;
   a second table supported to be movable in parallel with respect to the first table in a direction perpendicular to a moving direction of the first table;
   a second linear ultrasonic motor for driving the second table; and
   a second optical linear sensor for detecting an mount of movement of the second table;
   wherein the first linear ultrasonic motor, the first optical linear sensor, the second linear ultrasonic motor, and the second optical linear sensor are arranged in positions, which are at sides other than a front side of the ultrasonic motorized stage and prevent wear debris generated when at least one of the first linear ultrasonic motor and the second linear ultrasonic motor is driven from affecting the first optical linear sensor and the second optical linear sensor, so that the first linear ultrasonic motor, the first optical linear sensor, the second linear ultrasonic motor, and the second optical linear sensor do not protrude upward from an upper surface of the second table;
   wherein the second linear ultrasonic motor and the second optical linear sensor are arranged to be stacked in a height direction at a rear side of the ultrasonic motorized stage;
   wherein the second linear ultrasonic motor is arranged above the second optical linear sensor; and
   wherein a wear debris receiving unit for receiving wear debris generated when the second linear ultrasonic motor is driven is provided between the second linear ultrasonic motor and the second optical linear sensor.

2. The ultrasonic motorized stage according to claim 1, wherein the first linear ultrasonic motor and the first optical linear sensor are arranged separately at two sides of the ultrasonic motorized stage, which sandwich a driving axis of the first table.

3. The ultrasonic motorized stage according to claim 1, wherein the first linear ultrasonic motor and the first optical linear sensor are arranged to be stacked at any one of two sides of the ultrasonic motorized stage, which sandwich a driving axis of the first table.

4. The ultrasonic motorized stage according to claim 3, wherein the first linear ultrasonic motor is arranged above the first optical linear sensor.

5. The ultrasonic motorized stage according to claim 1, wherein the first linear ultrasonic motor and the first optical linear sensor are arranged side by side at any one of two sides of the ultrasonic motorized stage, which sandwich a driving axis of the first table.

6. An ultrasonic motorized stage, comprising:
   a base part;
   a first table supported to be movable in parallel with respect to the base part;
   a first linear ultrasonic motor for driving the first table;
   a first optical linear sensor for detecting an amount of movement of the first table;
   a second table supported to be movable in parallel with respect to the first table in a direction perpendicular to a moving direction of the first table;
   a second linear ultrasonic motor for driving the second table; and
   a second optical linear sensor for detecting an mount of movement of the second table;
   wherein the first linear ultrasonic motor, the first optical linear sensor, the second linear ultrasonic motor, and the second optical linear sensor are arranged in positions, which are at sides other than a front side of the ultrasonic motorized stage and prevent wear debris generated when at least one of the first linear ultrasonic motor and the second linear ultrasonic motor is driven from affecting the first optical linear sensor and the second optical linear sensor, so that the first linear ultrasonic motor, the first optical linear sensor, the second linear ultrasonic motor, and the second optical linear sensor do not protrude upward from an upper surface of the second table;

wherein the first linear ultrasonic motor and the first optical linear sensor are arranged to be stacked at any one of two sides of the ultrasonic motorized stage, which sandwich a driving axis of the first table;

wherein the first linear ultrasonic motor is arranged above the first optical linear sensor; and wherein a wear debris receiving unit for receiving wear debris generated when the first linear ultrasonic motor is driven is provided between the first linear ultrasonic motor and the first optical linear sensor.

7. The ultrasonic motorized stage according to claim 6, wherein the second linear ultrasonic motor is arranged above the second optical linear sensor.

8. The ultrasonic motorized stage according to claim 6, wherein the second linear ultrasonic motor and the second optical linear sensor are arranged side by side at a rear side of the ultrasonic motorized stage.

* * * * *